June 6, 1961  A. B. GRISINGER ET AL  2,987,345
VEHICLE BODY

Filed Jan. 13, 1958  2 Sheets-Sheet 1

A.B. GRISINGER
R.T. NOE
INVENTORS

BY E. C. McRae
J. R. Faulkner
J. H. Oster

ATTORNEYS

June 6, 1961 A. B. GRISINGER ET AL 2,987,345
VEHICLE BODY
Filed Jan. 13, 1958 2 Sheets-Sheet 2
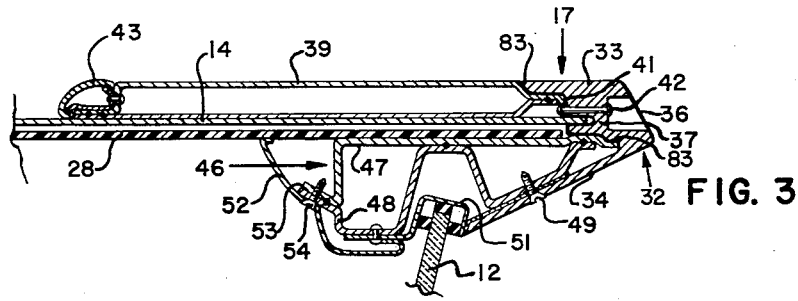
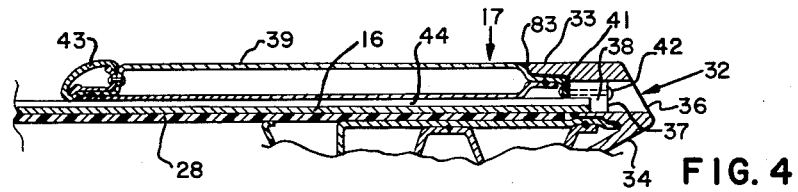
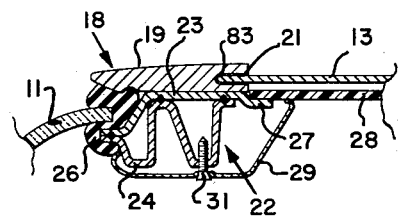
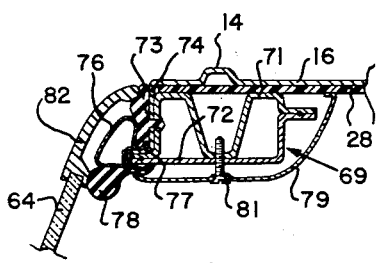
A. B. GRISINGER
R. T. NOE
INVENTORS
BY E. C. McRae
J. R. Faulkner
T. H. Oster
ATTORNEYS

United States Patent Office 2,987,345
Patented June 6, 1961

2,987,345
VEHICLE BODY
Arnott B. Grisinger, Bloomfield Hills, and Richard T. Noe, Birmingham, Mich., assignors to Ford Motor Company, Dearborn, Mich., a corporation of Delaware
Filed Jan. 13, 1958, Ser. No. 708,687
7 Claims. (Cl. 296—137)

This invention relates to motor vehicles and more particularly to a novel top for a motor vehicle or the like.

It is an object of the present invention to provide a novel roof construction which lends itself to economical manufacturing techniques, provides a maximum entrance opening, utilizes a minimum number of parts, and is aesthetic in appearance.

In the disclosed embodiment, the roof panel is rolled from sheet stock which may be fabricated from aluminum or other light materials. The length of the panel is sheared at each end permitting a variety of roof lengths without incurring tooling penalties normally associated with die impressed constructions. Longitudinal stability in the roof panel is attained by the utilization of rolled in or stamped longitudinal ribs which also are used in the removal of water from the roof. A fiberglass headliner is locally fixed to the roof panel with cement and then locked between the roof panel and the roof structural support members consisting of the side rails and headers in final assembly. Roof bows may be used, if so desired, to obtain the transverse crown effect.

In the preferred embodiment of the side rails, the drip, garnish and exterior trim moldings are replaced by a high structural strength extruded aluminum rail. An alternative fabricated steel construction is shown in which a minimum number of trim parts are required. Both constructions permit the use of snap-in weather stripping for easy assembly and service replacement. The roof rails are of a minimum height providing a maximum entrance area which is highly desirable in the lower vehicles of today.

With respect to the rear header, a safety roll bar construction is provided with a plurality of stylish, yet functional, longitudinal slots through which the roof moisture is drained.

Other objects and advantages of this invention will be made more apparent as this description proceeds, particularly when considered in connection with the accompanying drawings, wherein:

FIGURE 2 is a cross sectional view of the front header taken on the plane 2—2 of FIGURE 1;

FIGURE 3 is a cross sectional view of the rear header section taken through one of the ridges on the plane indicated by the line 3—3 of FIGURE 1;

FIGURE 4 is a cross sectional view similar to FIGURE 3 but taken on the land section between the ridges on the plane indicated by the line 4—4 of FIGURE 1;

Figure 1:
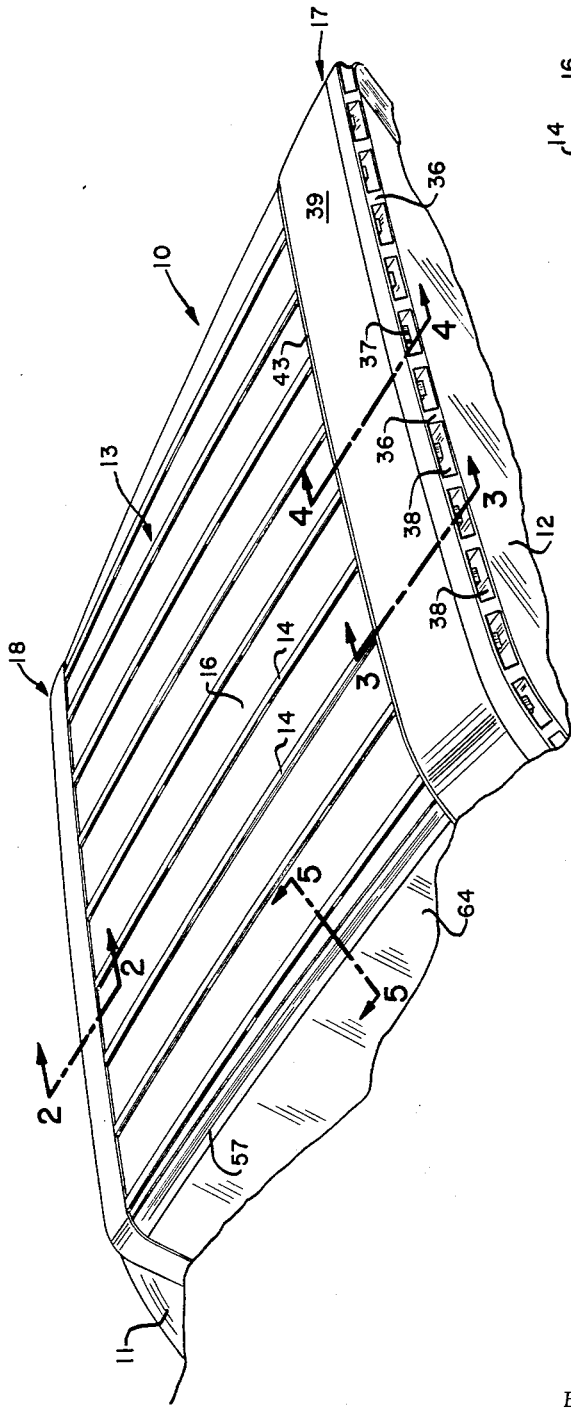
FIGURE 1 is a partial perspective drawing of a vehicle top embodying the applicants' invention.

Referring now to the drawings, and in particular FIGURE 1, a fragmentary roof section is shown generally indicated at 10 which may be used in a motor vehicle or the like. In detail, the roof 10 has a rolled top section 13 which has a windshield 11 located forwardly of it and a backlight 12 located rearwardly thereof. Top 13 is generally flat and is provided with a plurality of spaced apart ridges 14 between large land sections 16 which provide resistance to longitudinal deformation. Although any sheet material may be used for this purpose, the use of an anodized aluminum material would provide an attractive, light weight and durable top. The rear section of the vehicle is provided with a backlight 12 which is housed in the rear header construction indicated generally at 17.

In FIGURE 2, the front header arrangement 18 is shown. A transverse front header roof support 19 is provided having a transversely extending slot 21 at its rear edge for receiving the front edge of the rolled top 13. Roof panel front support 19 is attached to a transverse fabricated structural support 22 and is composed of upper and lower preformed sections 23 and 24 weldably secured to each other to form a pair of adjacent, closed channel sections. Windshield 11 is mounted in weatherstrip 26 which is positioned and held between the forward edge of support 22 and front header roof support 19. The rear edge of the upper support section 23 is extended rearwardly to form a ledge 27 for a fiberglass headliner 28. Headliner 28 is locally affixed to roof panel 13 with cement and is then secured to the front header by the ledge 27. A garnish molding 29 covers the support 22 and is secured to it by screws 31.

In FIGURE 3, the rear header 17 is shown which comprises a transverse roll bar 32 made from cast aluminum or other comparable material. In cross section, it is generally V-shaped and has an upper roof section 33 and a lower extending support section 34. The sections 33 and 34 are separated by a plurality of vertical spaced apart supports 36 and 37. Support 36 extends from the inside of the member in cross section to the exterior side of the member. Support 37, however, is separated from the vertical supports 36 by spaces 38 for a purpose to be later explained. A fabricated sandwich 39, made from sheet metal sections weldably secured together, is positioned forwardly of roll bar 32 and is secured by its rearward edge 41 to the vertical support 37 by rivets 42 or other equivalent means. At its forward edge, a molding 43 is secured to it by rivets or other equivalent means. It is to be noted that the molding 43 rests atop the roof ridge sections 14 so that there is a space 44 existing between the sandwich 39 and the land section 16 and this space 44 is open to atmosphere through the spaces 38. The space 44 is used for the passage of moisture from the roof sections rearwardly out through the rear header 17.

Fiberglass headliner 28 is, of course, stretched across the inner side of the roof 13 and is attached to the roof by a commercially available asphalt base adhesive. This liner is used to enhance the interior appearance of the vehicle, to absorb sound, and to act as an anti-squeak.

Support for the rear roll bar 33 and the headliner 28 is provided by a transversely extending channel member 46 comprising an upper and a lower bracket 47 and 48 weldably secured together to form a pair of closed transverse sections. Headliner 28 is cemented to bracket 47 which supports both the headliner 28 and the roof 13. The lower roll bar section 34 is secured by means of screws 49 to the outer end of the lower bracket 48. A backlight channel indicated generally at 51 is secured to the forward box section of the support 46 and to the rear box section by the screws 49. A garnish molding 52, extending transversely of the vehicle, is secured to the combined front edge 53 of the support 46 by means of screws 54 and covers the backlight channel attachment to the front box section.

Figure 5:
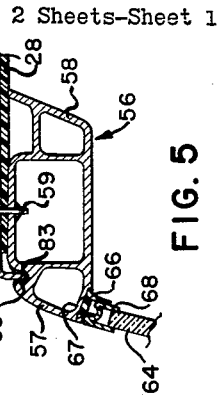
FIGURE 5 is an embodiment of a side rail section indicated by the line 5—5 of FIGURE 1 utilizing an extruded aluminum design; and, FIGURE 6 is an embodiment of a side rail assembly utilizing a fabricated steel design.

FIGURE 5 of the drawings shows the preferred extruded side rail which is indicated generally at 56. It is comprised of box-like longitudinal extending sections. The outside section 57 may be anodized to look and appear like a trim molding. The same anodized treatment may be applied to the interior surface 58. The roof 13 is secured to the side rail 56 by an anchor type bolt 59 secured in the ridge section 14 of the roof which extends into the central hollow box section of the rail 56. The edge of the roof is bent downwardly to form a depending flange 62 which extends into a recess 63 which has been sprayed with the adhesive to insure an air, water, and dirt seal. The seal between the door window and the side rail 56 is a snap-in weather seal 66 mounted in an appropriate longitudinally extending slot 67 in the rail 56. The seal 66 receives channel 68 of the side door (not shown) which is secured about side window 64.

A modification of the extruded aluminum side rail is shown in FIGURE 6 in which the side rail is fabricated from steel stampings. The fabricated stamping side rail 69 is provided in which upper and lower frame members 71 and 72 respectively, have been welded together to form a pair of longitudinally extending box sections. A longitudinally extending resilient weather-seal 73 is secured to the downwardly bent roof edge 74 and to one of the box sections in a conventional manner. A trim side molding 76 is snapped over the edge 77 of the roof and channel edge to hold the weather-seal 73 against the edge 77 and to hide the roof rail edge. An additional resilient weather-seal 78 is provided on the interior side of the rail and is held in place by an interior garnish molding 79 secured to the channel 69 by screws 81. In this embodiment, the outside trim is located on the side door as shown at 82. When the door is closed, trim 82 rests firmly against the resilient seals 73 and 78 to provide complete protection against the passage of moisture, dirt, and air.

As can be seen in the drawings, an asphalt adhesive 83 may be used between adjacent members to seal and/or adhesively join the parts. The adhesive 83 may be sprayed or brushed on the parts.

It will be understood that the invention is not to be limited to the exact construction shown and described, but that various changes and modifications may be made without departing from the spirit and scope of the invention, as defined in the appended claims.

What is claimed is:

1. A vehicle body roof construction having a front header, a rear header, side rails connected to said front and rear headers, and a roof panel supported by said header and side rails, said roof panel having a plurality of longitudinally disposed ridges, said rear header being provided with openings whereupon moisture collected on said roof panel between said ridges may be drained therefrom through said openings, said front header comprising a transverse structural support and a roof support exteriorly superimposed on and secured to the structural support, said roof support being provided with a longitudinal groove receiving the forward edge of said roof panel, a molding secured to said structural support to provide the interior trim for said header, said roof support and said structural support defining a windshield receiving area, and a resilient windshield weatherstrip inserted in said area.

2. A roof construction for a motor vehicle comprising, in combination, a roof frame having a front header, rear header, a pair of side rails rigidly connected to said front and rear header, a substantially flat roof panel having longitudinally extending spaced apart ribs adapted to cover said roof frame, recesses in said front and rear headers for receiving the roof panel, means for rigidly securing the roof panel to said side rails, and at least one drain aperture in said rear header between each of the ribs for permitting moisture collected on said roof panel to drain through said rear header, said side rails comprising a longitudinally extending extruded support member defining a door header, and door header sealing means secured to the underside of said support member.

3. A roof construction for a motor vehicle comprising, in combination, a roof frame having a front header, rear header, a pair of slide rails rigidly connected to said front and rear header, a substantially flat roof panel having longitudinally extending spaced apart ribs adapted to cover said roof frame, recesses in said front and rear headers for receiving the roof panel, means for rigidly securing the roof panel to said side rails, at least one drain aperture in said rear header between each of the ribs for permitting moisture collected on said roof panel to drain through said rear header, said side rail comprising a fabricated channel support, said roof panel having downwardly bent end flanges secured to said channel support, a longitudinally extending interior molding secured to the underside of the channel support effectively hiding the same, and resilient door sealing means mounted to said channel support.

4. In a vehicle body roof construction, a front header, side rails connected to said front header, a roof panel supported by said header and side rails, said front header comprising a transverse structural support and a roof support superimposed thereon and secured thereto, said roof support being provided with a longitudinal groove receiving the forward edge of said roof panel at the rear of said header, said roof support and said structural support defining a windshield receiving area at the front of said header, and a resilient windshield weatherstrip inserted in said area.

5. A vehicle body roof construction having a front header, a rear header, side rails connected to said front and rear headers, and a roof panel supported by said headers and side rails, said front header comprising a transverse structural support and a roof support superimposed and secured thereon, said roof support being provided with a longitudinal groove receiving the forward edge of said roof panel, each side rail comprising a fabricated channel support, said roof panel having downwardly bent end flanges secured to said channel supports, said roof panel having a plurality of longitudinally disposed ridges, said rear header being provided with openings whereupon moisture collected on said roof between said ridges may be drained from said roof through said openings.

6. A vehicle body roof construction as defined in claim 5 in which said roof support and said structural support define a windshield receiving area, and a resilient windshield weatherstrip is inserted in said area.

7. The structure defined by claim 6 which is further characterized in that each side rail defines a door header, and door header sealing means are secured to the underside of each side rail.

References Cited in the file of this patent

UNITED STATES PATENTS

| | | |
|---|---|---|
| 1,103,085 | Russell | July 14, 1914 |
| 1,521,064 | Ball | Dec. 30, 1924 |
| 1,855,747 | Ledwinka | Apr. 26, 1932 |
| 1,952,309 | Brockway et al. | Mar. 27, 1934 |
| 2,062,177 | Herron | Nov. 24, 1936 |
| 2,070,586 | Fitch | Feb. 16, 1937 |
| 2,094,077 | Miller | Sept. 28, 1937 |
| 2,578,052 | Evanoff | Dec. 11, 1951 |